(12) United States Patent
Roepling et al.

(10) Patent No.: US 10,065,378 B2
(45) Date of Patent: Sep. 4, 2018

(54) PRODUCTION AND REPARATION OF NON-POROUS LAMINATES WITH ASSESSABLE LOW DEGREE OF FIBER CONTENT

(71) Applicant: AIRBUS HELICOPTERS DEUTSCHLAND GMBH, Donauworth (DE)

(72) Inventors: Hannes Roepling, Munich (DE); Oliver Martinez Gandullo, Donauworth (DE); Markus Zellhuber, Oberndorf (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 827 days.

(21) Appl. No.: 14/551,350

(22) Filed: Nov. 24, 2014

(65) Prior Publication Data

US 2015/0145157 A1 May 28, 2015

(30) Foreign Application Priority Data

Nov. 25, 2013 (EP) ..................................... 13400032

(51) Int. Cl.
| | |
|---|---|
| *B29C 70/44* | (2006.01) |
| *B29C 73/10* | (2006.01) |
| *B29K 63/00* | (2006.01) |
| *B29K 307/04* | (2006.01) |
| *B29L 31/08* | (2006.01) |

(52) U.S. Cl.
CPC ............ *B29C 70/443* (2013.01); *B29C 73/10* (2013.01); *B29K 2063/00* (2013.01); *B29K 2307/04* (2013.01); *B29L 2031/082* (2013.01)

(58) Field of Classification Search
CPC ................................................... B29C 70/443
See application file for complete search history.

(56) References Cited

U.S. PATENT DOCUMENTS

| | | | |
|---|---|---|---|
| 6,406,660 B1 | 6/2002 | Spurgeon | |
| 2005/0073076 A1* | 4/2005 | Woods | B29C 70/443 264/511 |

FOREIGN PATENT DOCUMENTS

EP     1393883     3/2004

OTHER PUBLICATIONS

European Search Report for European Application No. 13400032, Completed by the European Patent Office dated Jul. 17, 2014, 5 Pages.

(Continued)

*Primary Examiner* — Larry W Thrower
(74) *Attorney, Agent, or Firm* — Brooks Kushman P.C.

(57) ABSTRACT

A method of forming a fiber reinforced composite structure having a fiber volume fraction (14) below 50 vol.-% using vacuum bag molding, the method comprising the steps of placing an assembly of fiber laminates (3) on a tool surface (1.1), creating a predetermined maximum difference of pressure (10) between the inside and the outside of an airtight envelope (4), infusing resin into the assembly of fiber laminates (3), reducing the difference of pressure between the inside and the outside of the airtight envelope (4), so that the assembly of fiber laminates (3) expands and the infusion of resin into the assembly of fiber laminates (3) continues thus forming a resin infused assembly of fiber laminates (3), and curing the resin infused assembly of fiber laminates (3).

15 Claims, 1 Drawing Sheet

(56) References Cited

OTHER PUBLICATIONS

Heider et al. FAA JAMS 2010 Technical Review Meeting XP-002727342, has been merged with XP-002728934 which is a list of articles for FAA JAMS 2010 Technical Review Meeting and lists the date of the NPL Heider et al. All together 15 Pages, "VARTM Variability and Substantiation."

Clarke., Structural Design of Polymer Composites, EUROCOMP Design Code and Handbook 1996, Book cover page and table of contents included with two copies of p. 251, XP 002727343, All together 10 Pages, "Table 1.3 The effect of arrangement and volume fraction of fibre."

* cited by examiner

PRODUCTION AND REPARATION OF NON-POROUS LAMINATES WITH ASSESSABLE LOW DEGREE OF FIBER CONTENT

CROSS REFERENCE TO RELATED APPLICATION

This application claims priority to European patent application No. EP 13 400032.2 filed on Nov. 25, 2013, the disclosure of which is incorporated in its entirety by reference herein.

BACKGROUND OF THE INVENTION

(1) Field of the Invention

The present invention relates to a method for producing and repairing fiber reinforced composite structures with a low, fewer than 50 vol.-%, fiber volume fraction and with low porosity, using vacuum bag molding. The invention is applicable, but not limited, to helicopter parts and, in particular, to rotor blades.

(2) Description of Related Art

In the process of fabrication and reparation of fiber reinforced composite structures, certain parameters are of the utmost importance to make the structure suitable for the role it is intended for. One of these parameters is the fiber volume fraction, that is, the fiber volume content with respect to volume of the whole structure. The fiber volume fraction value determines properties of the structure such as the dynamic strength. Therefore, finding fabrication and reparation methods that allow the adjustability of the fiber volume percentage is convenient for increasing the lifetime of composite structures, especially those under demanding dynamic loads, such as helicopter rotor blades.

Vacuum bag molding methods use atmospheric pressure as a clamp to hold fiber laminates together, by means of an airtight open tool on which an airtight bag is sealed to form an airtight volume. When the pressure in the inside is reduced, evacuating air with a vacuum pump, the atmospheric pressure forces the bag, the laminates and the tool together.

Most of prior art vacuum bag molding methods do not disclose processes for actually obtaining, when carried out experimentally, structures with an exact value of fiber volume fraction. Moreover, these methods usually entail another disadvantage. These methods' final products can be characterized by their relatively high content of fiber volume fraction, around or higher than 50 vol.-%. Although high values are adequate for many applications, in other cases structures with contents of fiber below 50 vol.-% are required; for instance, when there are parts prone to suffering important fatigue damages.

If the solution to obtain such low fiber volume fraction structures with vacuum bag molding is to add a large excess of resin, the result is that the quality of the final product drops as a consequence of the high void content resulting from the low process pressures associated to such excesses of resin.

U.S. Pat. No. 6,406,660 B1 looks to overcome such inconveniences by proposing a vacuum bag molding method for producing composite materials with a low volume fraction of reinforcement fiber and without significant void content that works as follows: rigid supports or spacers, like metal bars or rods, are placed on two opposite sides of the fabric stack, and a rigid cover plate, typically of metal as well, is placed over the assembly so that it rests on the supports. The system employs standard vacuum assisted resin transfer molding (VARTM), with the fill line and the vacuum line placed on opposite unsupported sides of the assembly.

This method, however, requires more pieces of equipment than a conventional vacuum bag molding method. Moreover, although the thickness of the component can be controlled, such adjustment is not described for the fiber volume fraction.

BRIEF SUMMARY OF THE INVENTION

The object of the invention is to provide a method of forming a fiber reinforced composite structure having a fiber volume fraction below 50 vol.-% using vacuum bag molding, without significant porosity and without needing more equipment than standard vacuum bag molding processes.

This inventive method comprises the steps of:
placing an assembly of fiber laminates on a tool surface;
placing a vacuum bag comprising a resin inlet over said assembly of fiber laminates and sealing the vacuum bag against the tool surface, thus forming an airtight envelope;
creating a predetermined maximum difference of pressure between the inside and the outside of the airtight envelope;
infusing resin into the assembly of laminates through the resin inlet of the vacuum bag while keeping the maximum difference of pressure, until the assembly of fiber laminates is completely filled with resin, during a first infusion time;
during a second infusion time, reducing the difference of pressure between the inside and the outside of the airtight envelope, such difference of pressure reaching during this step a predetermined minimum value, inferior to the predetermined maximum difference of pressure, so that the assembly of fiber laminates expands and the infusion of resin into the assembly of fiber laminates continues thus forming a resin infused assembly of fiber preform laminates;
closing the resin inlet;
curing the resin infused assembly of fiber laminates at the minimum value of the difference of pressure between the inside and the outside of the airtight envelope reached during the second infusion time, thus forming a fiber reinforced composite structure having a fiber volume fraction below 50 vol.-%.

The fiber volume fraction is the percentage of volume fiber in the reinforced composite structure. The higher this percentage, the stiffer and stronger the composite structure. Consequently, some applications which demand flexible materials need low values of fiber volume fraction. Such values are difficult to achieve with vacuum bag molding without diminishing the quality of the final product.

Vacuum bag molding processes are well known in the art. Their starting step is placing either an assembly of fiber prepreg laminates or, as in the present invention, an assembly of fiber laminates infused with resin later in the process, on a surface of a molding tool.

The term "fiber laminates" refers to both the "fiber preforms", that is, the dry fiber mats, not cured yet, which generally build up to form final composite structures, and to the "fiber reinforced laminates", that is, the cured dry fiber mats which are already part of an structure in need for reparation.

A closed airtight volume, referred to as airtight envelope, is formed between the surface of the tool on which the assembly of fiber laminates is placed and the vacuum bag, by sealing the vacuum bag to the tool surface.

The step of creating the predetermined maximum difference of pressure between the inside and the outside of the airtight envelope makes use of a vacuum pump with which the air is drawn from the system and exhausted to the atmosphere so that the pressure inside the airtight envelope decreases, thus creating an increasing difference of pressure between the inside and the outside of the airtight envelope. The predetermined maximum difference is preferably comprised between 750 mbar and 1000 mbar and, even more preferably, between 900 mbar and 1000 mbar. These values correspond to ranges of pressure inside the airtight envelope of 0-250 mbar and 0-100 mbar, respectively.

The dry assembly of fiber laminates is then infused with resin. The resin is introduced from outside the airtight envelope through the resin inlet of the vacuum bag and into the assembly of dry fiber laminates, until it fully infuses the assembly.

Vacuum bag resin infusion processes are generally intended for providing composite materials with a high fiber volume fraction and for avoiding voids; if this method is employed for making composite materials with fiber volume fraction below 50 vol.-%, adding a large excess of resin, the void content rises due to the lower process pressures.

The present invention overcomes such inconvenient by dividing the infusion into two steps. Thus, it is possible to obtain, at the same time, composite structures with fiber volume fractions below 50 vol.-% and with little void content.

During the second infusion time, the difference of pressure between the inside and the outside of the airtight envelope is reduced following a certain function until it reaches a predetermined minimum value preferably comprised between 100 mbar and 750 mbar; more preferably, between 300 and 450 mbar; and even more preferably between 400 mbar and 450 mbar. As a result, the pressure exerted by the atmosphere on the assembly is lower, and the assembly expands allowing that the infusion of resin can continue without excesses of resin.

Investigations surprisingly show that if an infusion is carried out with a high difference of pressure, that is, with values such as the predetermined maximum difference of pressure of the first infusion time, the low porosity that results from this step remains that low even if the difference of pressure is later reduced to make a further infusion without excess of resin possible.

This way, the claimed method does not require additional elements such as spacers or metal cover plates to achieve the commented technical advantages, just the explained variation of pressures is sufficient. Thus, the process is shorter, cheaper and more simple than those of the prior art needing such extra items.

When the assembly is fully resin infused and the resin inlet has been conveniently closed, the resin infused assembly of fiber laminates is cured at the vacuum difference of pressure value with which the second infusion time ended, that is, at the predetermined minimum difference of pressure.

Not only does the claimed invention achieve to combine low porosity with low fiber volume fractions and without requiring additional elements with respect to conventional resin infusion vacuum bag molding, but it also permits that such low fiber volume fraction can be controlled. A precise value of the fiber volume fraction can be obtained by modifying the parameters that intervene in the process, mainly the function of the reduction of the difference of pressure, the maximum and minimum values of such function, the second infusion time and others such as the temperature of the infusion. Later in the description, some sets of parameters that produce determined fiber volume fractions are discussed.

It should be noted that the equipment usually employed in vacuum bag molding processes is also suitable for carrying out the claimed process. Examples of such pieces of equipment are a vacuum pump, a pressure gauge, breather material, release fabric or mastic sealant. Their way of working and their role in the invention is not specified for the sake of conciseness.

The present invention also proposes a method for repairing a fiber reinforced composite material according to claim 9. The assembly of fiber laminates is comprised by fiber reinforced laminates of the part or component that is to be repaired plus additional fiber preforms attached, as a repair patch, to such component for its reinforcement. The rest of the process follows the same steps as described for the fabrication method. This repair process is thus as cheap and simple as the making process and it also provides adjustable fractions of fiber volume—it therefore represents a clear improvement over prior art disclosures for repairing damaged parts.

The reduction of the difference of pressure between the inside and the outside of the airtight envelope during the second infusion time may follow different functions.

In an embodiment, there is a linear reduction of the difference of pressure between the inside and the outside of the airtight envelope during the second infusion time.

Such reduction provides fiber reinforced composite structures with a fiber volume fraction between 45 vol.-% and 50 vol.-%, depending on the values of other parameters such as the first and second infusion times, the infusion temperature, the predetermined maximum difference of pressure and the predetermined minimum difference of pressure.

In yet another embodiment, the reduction of the difference of pressure between the inside and the outside of the airtight envelope during the second infusion time describes a linear decrease followed by a constant pressure interval.

This function produces fiber reinforced composite structures with a fiber volume fraction between 40 vol.-% and 50 vol.-%, depending on the values of other parameters such as the first and second infusion times, the infusion temperature, the predetermined maximum difference of pressure and the predetermined minimum difference of pressure.

In yet another embodiment, the linear decrease of the previous embodiment is an instant decrease so that the function described by the difference of pressure between the inside and the outside of the airtight envelope during the second infusion time is a step function.

This function of the difference of pressure yields a fiber reinforced composite structure with a fiber volume fraction between 30 vol.-% and 50 vol.-%, depending on the values of other parameters such as the first and second infusion times, the infusion temperature, the predetermined maximum difference of pressure and the predetermined minimum difference of pressure.

In an example, the step of infusing resin into the assembly of fiber laminates during the first and second infusion times is carried out at a temperature between 60° C. and 80° C.

This range of temperatures is particularly suitable for the resins employed in rotor blade reparations.

In another example, the step of infusing resin into the assembly of fiber laminates during the first and second infusion times is carried out at a temperature between 100° C. and 120° C.

This range of temperature is preferred for standard resins used in vacuum bag molding methods with resin infusion.

In a particular example, the resin is epoxy resin and, more particularly, high temperature epoxy resin.

In a particular example, the second infusion time is comprised between 3 and 7 minutes. This interval is preferably used in rotor blade reparations. In another example, the second infusion time is comprised between 3 and 7 minutes. Such range is adequate for standard resins used in vacuum bag molding methods with resin infusion.

The second infusion time does also affect the fiber volume fraction. In particular, the range between 1 and 7 minutes permits obtaining a fiber composite structure with a fiber volume fraction between 42 vol.-% and 50 vol.-%.

The fiber of the assembly of fiber laminates is, in an embodiment, carbon fiber. Carbon fiber composite structures are common in the fabrication of rotatory aircraft parts.

Indeed, one of the many applications of the present invention is the fabrication and reparation of rotatory aircraft parts. Thus, in an embodiment, the fiber reinforced composite structure is a rotatory aircraft part and, in a particular case of this embodiment, such rotatory aircraft part is a rotor blade.

BRIEF DESCRIPTION OF THE SEVERAL VIEWS OF THE DRAWINGS

These and other features and advantages of the invention will become more evident from the following detailed description of preferred embodiments, given only by way of illustrative and non-limiting example, in reference to the attached figures.

DETAILED DESCRIPTION OF THE INVENTION

Figure 1:
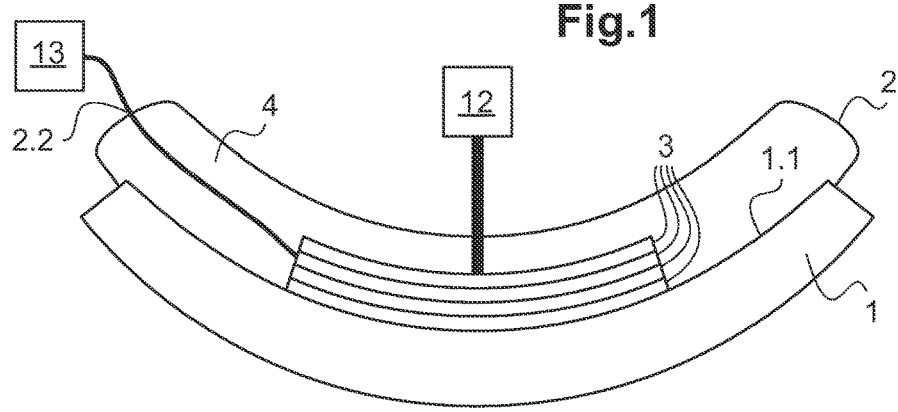
FIG. 1 shows a schematic representation of the equipment used for the method of the present invention, similar to the equipment of any standard vacuum bag molding process.

The present invention makes use of conventional vacuum bag molding equipment, represented in FIG. 1. There is an open mold comprised by a tool 1, one of whose surfaces 1.1 has the appropriate configuration for producing a final structure with a certain form, and a vacuum bag 2 that is sealed to the surface 1.1 of the tool 1 by means of a mastic sealant or with any other standard procedure.

Before the sealing, the fiber laminates 3 are stacked and placed on the surface 1.1 of the tool 1. Again, auxiliary elements such as a mold release to facilitate the separation of the final composite structure and the tool 1 at the end of the process, or a breather material for allowing air from all parts of the envelope to be withdrawn, can be used in the present invention.

By means of a vacuum pump 12, the air is evacuated from the airtight envelope 4 formed between the surface 1.1 of the tool 1 and the vacuum bag 2, the assembly of stacked fiber laminates 3 remaining inside such airtight envelope 4.

Figure 2:
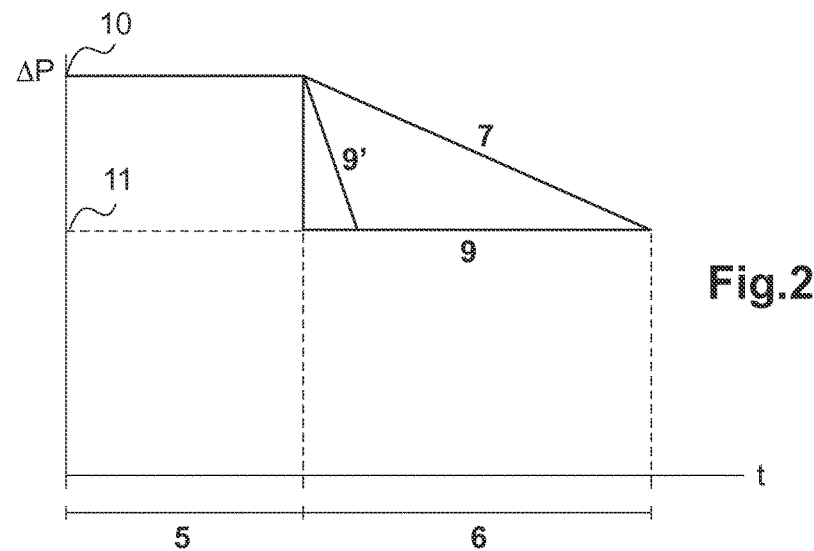
FIG. 2 shows a diagram in which different functions for the decrease of the difference of pressure between the inside and the outside of the airtight envelope are represented.

FIG. 2 depicts the evolution of the difference of pressure $\Delta P$ between the inside and the outside of the airtight envelope 4. A reasonable value for the minimum pressure that can be reached in the airtight envelope 4 is between 0 mbar and 250 mbar and, a preferred value is between 0 bar and 100 mbar; that is, the maximum difference of pressure 10 between the inside and the outside of the airtight envelope 4 is, in an example, between 750 mbar and 1000 mbar, and a preferred value is between 900 mbar and 1000 mbar. At such maximum difference of pressure 10, which remains constant during the first infusion time 5 in the example of FIG. 2, the pressure exerted by the atmosphere on the assembly of fiber laminates 3 is also at its highest value of the process, which is ideal for a resin infusion resulting in a non-porous fiber reinforced composite structure.

The resin, stored in a resin reservoir 13, is infused in the assembly of fiber laminates 3 as in any conventional vacuum bag process through the resin inlet 2.2 of the vacuum bag 2. It is important to impede an excess of resin in the assembly of fiber laminates 3. Differently to the processes of the prior art, the flow of resin is not interrupted when the laminates 3 are fully infused. At such instant, end of the first infusion time 5, the difference of pressure $\Delta P$ between the inside and the outside of the airtight envelope 4 is reduced. Such reduction, carried out in the second infusion time 6, may be done according to different functions 7, 9, 9', some of which are depicted in FIG. 2.

As a result of the lower pressure that the atmosphere exerts on the assembly of fiber laminates 3, the assembly expands and the infusion of resin can continue without overflowing the fiber laminates 3, so that, as has been explained, the fiber volume fraction 14, over 50 vol.-% after the first infusion time 5, lowers without an increment of the porosity.

Figure 3:
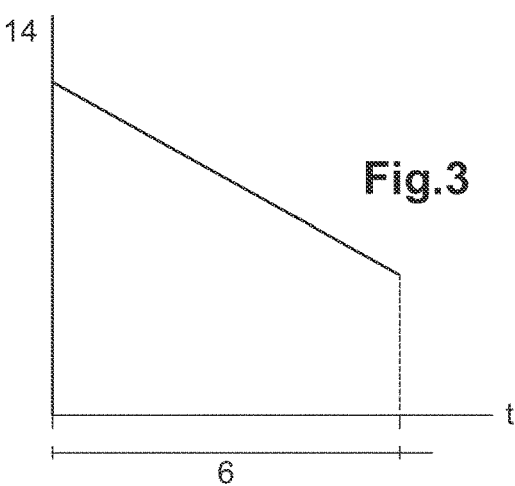
FIG. 3 represents the reduction of the fiber volume fraction as a function of the second infusion time.

FIG. 3 shows a particular example in which the fiber volume fraction 14 decreases linearly with the second infusion time 6.

The reduction of the difference of pressure $\Delta P$ ends when a given value 11, shown in FIG. 2, is reached, and after that instant it remains constant for the rest of the second infusion time 6, if this happens before the end of this second infusion time 6 as in the cases of the reduction according to a step function 9 or to a linear decrease 9' followed by a constant pressure interval, and during the curing step. This predetermined minimum value 11 of the difference of pressure is comprised between 100 mbar and 750 mbar; more preferably, between 300 and 450 mbar; and even more preferably between 400 mbar and 450 mbar.

In the particular example of FIG. 2, the linear reduction 7 of the difference of pressure leads to fiber volume fraction 14 between 45 vol.-% and 50 vol.-%, the reduction according to a linear decrease 9' followed by a constant pressure interval produces structures with a fiber volume fraction 14 between 40 vol.-% and 50 vol.-%; and the reduction following a step function gives as a result fiber volume fractions 14 ranging between 35 vol.-% and 50 vol.-%.

There are other parameters that have an influence on the value of the fiber volume fraction 14. Some of them are the infusion times 5, 6 and the temperature at which the infusion takes place. In a particular embodiment, the temperature of infusion is between 60° C. and 120° C., the first infusion time 5 is between 1 min and 20 min and the second infusion time 6 is between 1 and 7 min. With such combination of parameters, the value of the fiber volume fraction 14 of the resulting final composite structure is between 46 vol.-% and 48 vol.-%, depending on the value of the rest of the mentioned parameters.

In yet another particular example, the function of reduction of the difference of pressure ΔP during the second infusion time 6 is step function; the predetermined maximum difference of pressure 10 is between 900 mbar and 1000 mbar; the predetermined minimum difference of pressure 11 is between 400 mbar and 450 mbar; the first infusion time 5 is between 1 min and 20 min; the second infusion time 6 is between 1 and 5 min; and the infusion of resin into the assembly of fiber laminates 3 during the first and second infusion times 5, 6 is carried out at a temperature between 60° C. and 80° C. Such combination of parameters yields a final product with a fiber volume fraction 14 of 47 vol.-%.

The second infusion time 6 ends when the preform laminates 3 are again fully infused with resin and the expansion has finished. After this, the method of the present invention follows the standard procedures of vacuum bag molding. The resin inlet 2.2 is closed so that the infusion ends at the exact time when the laminates 3 are infused. Subsequently, the infused assembly of fiber laminates 3 is cured, maintaining the predetermined minimum difference of pressure 11 and at the conditions that are appropriate for curing processes with vacuum bag molding.

The present invention has, among its applications, the fabrication and reparation of helicopter parts, and concretely rotor blades, which demand properties like the ones that the composite structures resulting from the inventive process can offer. A common material for the fiber of the preform laminates 3 of helicopter parts is carbon fiber.

REFERENCE LIST

1. Tool
1.1. Tool surface
2. Vacuum bag
2.2. Vacuum bag resin inlet
3. Fiber laminates
4. Airtight envelope
5. First infusion time
6. Second infusion time
7. Linear reduction of the difference of pressure in the second infusion time
9. Step-function reduction of the difference of pressure in the second infusion time
9'. Reduction of the difference of pressure according to a linear decrease followed by a constant pressure interval in the second infusion time
10. Maximum difference of pressure
11. Minimum difference of pressure
12. Vacuum pump
13. Resin reservoir
14. Fiber volume fraction
ΔP. Difference of pressure

What is claimed is:

1. A method of forming a fiber reinforced composite structure having a fiber volume fraction below 50 vol.-% using vacuum bag molding, the method comprising the steps of:
    placing an assembly of fiber laminates on a tool surface;
    placing a vacuum bag comprising a resin inlet over the assembly of fiber laminates and sealing the vacuum bag against the tool surface, thus forming an airtight envelope;
    creating a predetermined maximum difference of pressure between the inside and the outside of the airtight envelope;
    during a first infusion time, creating a flow of resin in the vacuum bag by infusing resin into the assembly of fiber laminates through the resin inlet of the vacuum bag while keeping the maximum difference of pressure, until the assembly of fiber laminates is completely filled with resin, wherein the assembly of fiber laminates is formed with a fiber volume fraction of more than 50 vol.-%;
    during a second infusion time, reducing the difference of pressure between the inside and the outside of the airtight envelope without interrupting the flow of resin, such difference of pressure reaching during the second infusion time a predetermined minimum value, inferior to the predetermined maximum difference of pressure, so that the assembly of fiber laminates expands and infusing resin into the assembly of fiber laminates continues thus forming a resin infused assembly of fiber laminates with a fiber volume fraction below 50 vol.-%;
    closing the resin inlet;
    curing the resin infused assembly of fiber laminates at the minimum value of the difference of pressure between the inside and the outside of the airtight envelope reached during the second infusion time, thus forming a fiber reinforced composite structure having a fiber volume fraction below 50 vol.-%.

2. A method according to claim 1, wherein there is a linear reduction of the difference of pressure between the inside and the outside of the airtight envelope during the second infusion time.

3. A method according to claim 1, wherein a reduction of the difference of pressure between the inside and the outside of the airtight envelope during the second infusion time describes a linear decrease followed by a constant pressure interval.

4. A method according to claim 3, wherein the linear decrease is an instant decrease so that a function described by the difference of pressure between the inside and the outside of the airtight envelope during the second infusion time is a step function.

5. A method according to claim 1, wherein the second infusion time is comprised between 1 and 7 minutes.

6. A method according to claim 1, wherein the step of infusing resin into the assembly of fiber laminates during the first and second infusion times is carried out at a temperature between 60° C. and 80° C.

7. A method according to claim 1, wherein the step of infusing resin into the assembly of fiber laminates during the first and second infusion times is carried out at a temperature between 100° C. and 120° C.

8. A method according to claim 1, wherein the fiber of the assembly of fiber laminates is carbon fiber.

9. A method according to claim 1, wherein the assembly of fiber laminates comprises fiber reinforced laminates from a fiber reinforced composite part which is to be repaired and additional fiber preforms.

10. A method according to claim 1, in which the fiber reinforced composite structure is a rotatory aircraft part.

11. A method according to claim 10, in which the rotatory aircraft part is a rotor blade.

12. A method according to claim 1, wherein the predetermined maximum difference of pressure between the inside and the outside of the airtight envelope is between 750 mbar and 1000 mbar.

13. A method according to claim 1, wherein a predetermined minimum difference of pressure between the inside and the outside of the airtight envelope is between 100 mbar and 750 mbar.

14. A method according to claim 1, wherein a predetermined maximum difference of pressure between the inside and the outside of the airtight envelope is between 900 mbar and 1000 mbar, and wherein the predetermined minimum difference of pressure between the inside and the outside of the airtight envelope is between 400 mbar and 750 mbar.

15. A method according to claim 1, wherein the resin is a high temperature epoxy resin.

\* \* \* \* \*